(No Model.)

S. G. VOGELEY.
MANUFACTURE OF GLASS STANDS AND PEDESTALS.

No. 274,233. Patented Mar. 20, 1883.

(No Model.)  2 Sheets—Sheet 2.

S. G. VOGELEY.
MANUFACTURE OF GLASS STANDS AND PEDESTALS.

No. 274,233.  Patented Mar. 20, 1883.

UNITED STATES PATENT OFFICE.

SAMUEL G. VOGELEY, OF PITTSBURG, PENNSYLVANIA.

MANUFACTURE OF GLASS STANDS AND PEDESTALS.

SPECIFICATION forming part of Letters Patent No. 274,233, dated March 20, 1883.

Application filed February 6, 1883. (No model.)

*To all whom it may concern:*

Be it known that I, SAMUEL G. VOGELEY, of Pittsburg, in the county of Allegheny and State of Pennsylvania, have invented a new and useful Improvement in the Manufacture of Glass Stands and Pedestals; and I do hereby declare the following to be a full, clear, and exact description thereof, reference being had to the accompanying drawings, forming a part of this specification, in which—

Figure 1:
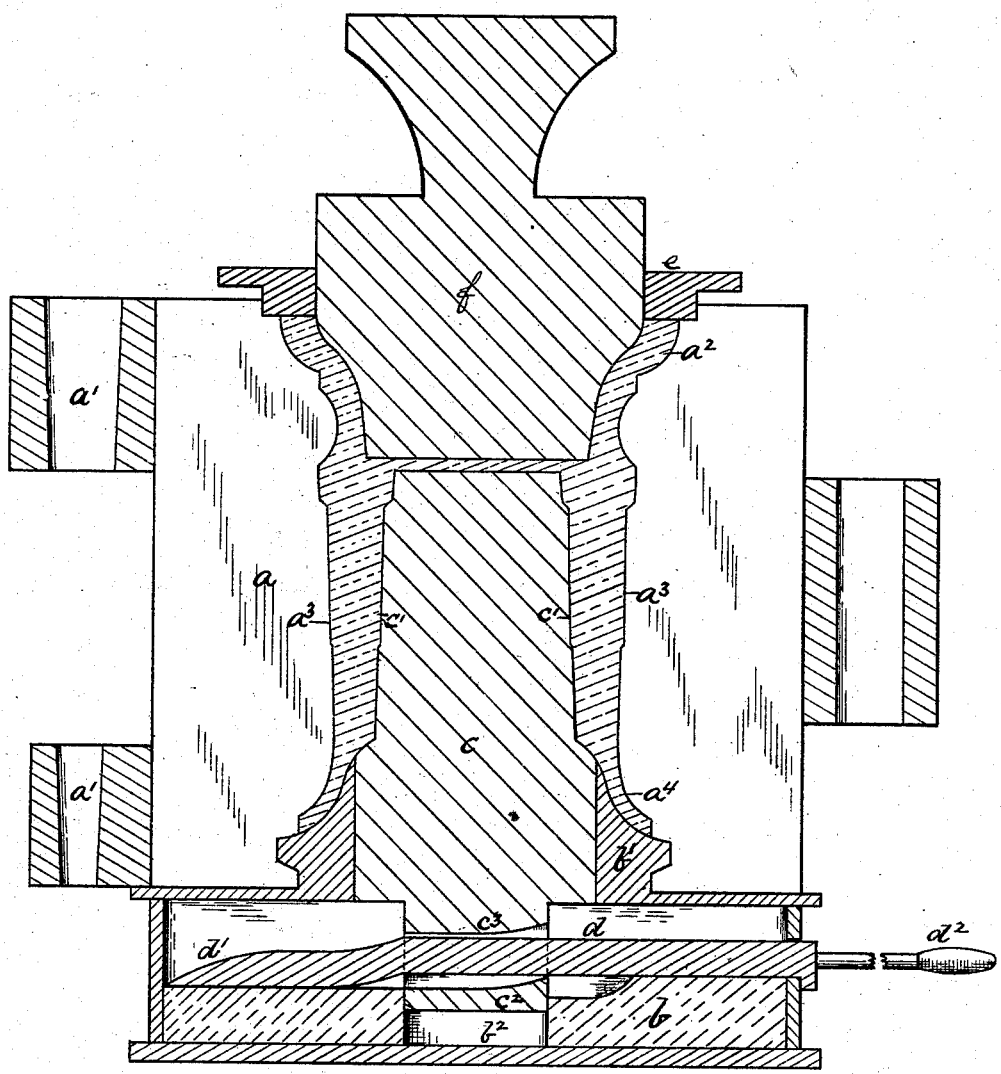
Figure 2:
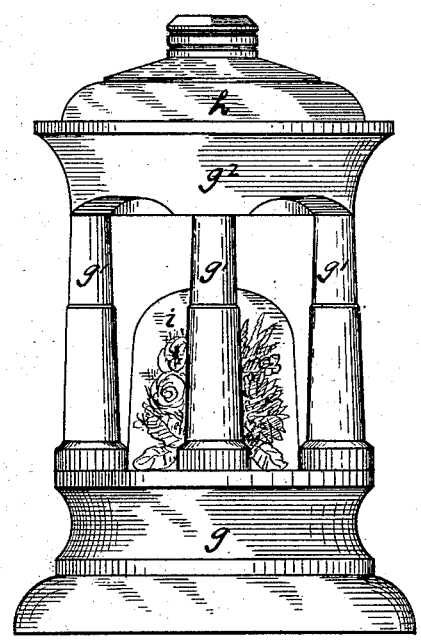
Figure 3:
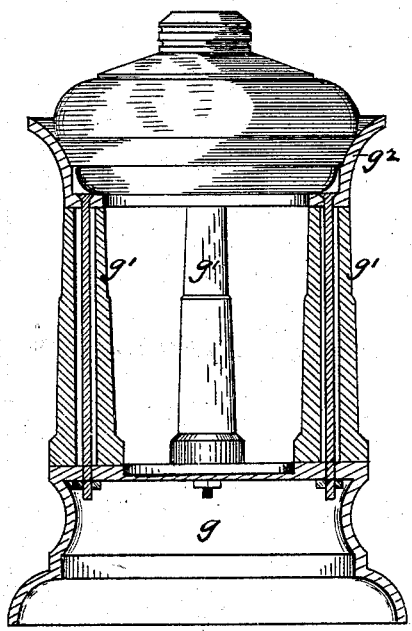

Figure 1 is a vertical section of a mold for making my improved glass stand or pedestal. Fig. 2 is a side elevation of the stand or pedestal, and Fig. 3 is a sectional view of a modified form.

Like letters of reference indicate like parts in each.

The mold $a$ is made in two parts, hinged together at $a'$, and has a matrix or molding-cavity extending vertically through it. The upper end, $a^2$, of this cavity is comparatively wide and capacious, as it is that portion which receives the glass, which is forced down to form the other parts as well as to make the foot. In the sides are two or more vertical grooves, $a^3$, in which the stems or columns are formed, and at the lower end is a flared or expanded portion, $a^4$, for forming the ring at the upper end of the pedestal. The mold $a$ is supported on a stand, $b$, having an annular projection, $b'$, around which it closes. The upper face of the ring $b'$ constitutes the molding-face, which forms the upper face or edge of the top ring of the pedestal. In the lower end of the molding-cavity is a movable piston or plug, $c$, which passes up through the annulus $b'$, and is provided with vertical grooves $c'$ in its sides, corresponding to and placed opposite the grooves $a^3$, so that the stems or columns of the pedestal are formed in holes common to the mold and plug. On the lower end of the plug is a projection, $c^2$, having a lateral slot through it, in the upper side of which is an inclined surface, $c^3$. A sliding bar, $d$, having an inclined end, $d'$, and a handle, $d^2$, which projects beyond the side of the mold-stand $d$, is provided. The normal position of the plug $c$ is down, the lower end of the projection $c^2$ resting on the bottom plate, $b^2$, of the mold-stand. If, then, the tapered or beveled end of the bar $d$ is inserted under the incline $c^3$ and the bar pushed in, the plug will be raised to the position it occupies in the mold during the molding operation, as shown in Fig. 1. The mold is provided with the usual ring, $e$, for limiting the upward flow of the glass, and with a plunger, $f$.

The operation of pressing the pedestal is as follows: The requisite quantity of glass is placed in the mold. The plunger then descends and forces a portion of it down through the grooves $a^3 c'$, filling the grooves and the cavity $a^4$, and at the same time forms the foot in the cavity $a^2$. The plunger is then removed, the plug $c$ allowed to fall, by drawing out the bar $d$, to prevent the glass shrinking thereon, the mold opened, and the article removed to the leer. The article thus made is shown in Fig. 2, and it consists of a base or foot, $g$, columns or stems $g'$, and a ring, $g^2$, the latter in the present case being of concave form to receive a lamp-fount, $h$, or other similar article. If desired, a shade, $i$, containing flowers, as shown, or a statuette or other ornament may be placed on the base $g$ between the columns. The pedestal thus made is one piece of glass, and constitutes a cheap but handsome stand for lamps, epergnes, flower baskets or pots, and many other articles. I do not limit myself, however, to glass, but also include earthen or ceramic ware such as may be molded generally.

In Fig. 3 I show a modification. Here the base $g$, columns $g'$, and ring $g^2$ are made in separate pieces and joined together by bolts extending through the columns. When constructed in this way the base and ring may be molded of glass or other ceramic ware, and the columns be made of wood, brass, britannia, or other metal. The contrast thus produced makes a handsome article.

I do not limit myself to a pedestal having four columns or stems, but claim, broadly, a glass or ceramic ware pedestal having two or more pedestals.

It is apparent to the skilled operator that by making the mold and plug with the requisite number of vertical grooves the pedestal can be made with any desired numbers of columns. Two columns arranged at opposite or nearly opposite points are necessary to the proper support of the upper ring, $g^2$.

I have used the terms "stems or columns,"

but I do not limit myself to making them of round or any other particular form. If desired, they may be made of the shape of the statuettes, limbs of animals, stems of plants, leaves or other forms which are suitable to constitute the shape of the supporting devices of the upper ring.

What I claim as my invention, and desire to secure by Letters Patent, is—

1. A mold for forming glass pedestals, having a vertically-grooved and vertically-movable plug, in combination with an annular ring which constitutes the bottom of the mold, and through which the plug is inserted into the mold, substantially as and for the purposes described.

2. The combination, in a mold for forming glass pedestals, of a vertically-grooved and vertically-movable plug entering the cavity of the mold, an annular ring constituting the bottom of the mold, through which the plug is inserted, and devices for giving a vertical movement to the plug, substantially as and for the purposes described.

3. A mold for making glass pedestals, having a central plug, and vertical grooves, common to both mold and plug, connecting the foot and top cavities, substantially as and for the purposes described.

4. A pedestal for lamps and other articles, of glass or earthenware, consisting of a base or foot and a top ring or annulus connected together by two or more columns, all formed in one piece, substantially as and for the purposes described.

5. A pedestal for lamps and other articles, having a glass or earthenware base and top ring, said ring being supported by two or more columns, substantially as and for the purposes described.

In testimony whereof I have hereunto set my hand this 1st day of February, A. D. 1882.

SAMUEL G. VOGELEY.

Witnesses:
W. B. CORWIN,
T. B. KERR.